United States Patent Office 3,493,398
Patented Feb. 3, 1970

3,493,398
METHOD OF REMOVING ALGIN FOOD COATING FROM A FOOD COATED THEREWITH
Roland D. Earle, 749 N. South Lake Drive, Hollywood, Fla. 33020
No Drawing. Continuation-in-part of application Ser. No. 456,482, May 17, 1965. This application July 2, 1968, Ser. No. 741,862
Int. Cl. A23b 1/00
U.S. Cl. 99—166        3 Claims

ABSTRACT OF THE DISCLOSURE

The removal of algin or algin containing composition used as a casing or coating for preserving food without changing or damaging the food products or coating. While normally eaten with the food, removal of the coating may in some cases be desirable or even necessary; as, for example, foods requiring governmental inspection.

This application is a continuation in part of my earlier filed co-pending patent application, Ser. No. 456,482, filed May 17, 1965 now Patent No. 3,395,024.

BACKGROUND OF THE INVENTION

Algin or algin containing compositions have been used in the coating of food products both as an outside casing and as a coating to preserve the food. Such coatings are colorless, tasteless and odorless, and generally are not removed prior to cooking and eating of the food products so coated. The coating which substantially surrounds the food product improves its quality after cooking, as it retards evaporation of the natural moisture during cooking. Flavor is likewise improved, since the coating holds in or retains the delicate volatile flavors of the food which are normally "blasted off" during cooking.

While the algin or algin containing coating surrounding the food is normally eaten with the food, there may be conditions under which it is either desirable or necessary to remove the coating. For example, foods which are normally eaten raw or cooked by boiling in water should have the coating removed prior to cooking. Also, foods which have a waxy outside shell or skin, such as, peas, corn, lima beans, etc. should generally be eaten with the coating removed. Also, the removal of the coating is not only desirable, but is absolutely essential where the coated food product requires governmental inspection and weighing. In fact, the invention disclosed in my co-pending patent application, Ser. No. 456,482, would not be commercially practical for meat products requiring governmental inspection and weighing unless the coating composition could be removed therefrom without damage or change to the food product so coated.

SUMMARY OF THE INVENTION

This invention relates to the removal of food coatings and more particularly to the removal of algin and algin containing composition food coatings without causing any substantial change or injury to the original food product.

It is an object of my invention to provide means for removing algin and algin containing coatings from food products so coated.

It is a further object of my invention to provide means for removing algin and algin containing coatings from food products so coated without substantial injury, damage or change to the food product.

It is a still further object of my invention to provide means for removing algin and algin containing coatings from food so coated which can be combined with established inspection procedures and which will not cause any substantial injury, damage or change to the food product so coated.

These and other objects and advantages of my invention will become readily apparent to those skilled in the art from a further reading of the specification.

DETAILED DESCRIPTION OF THE INVENTION

The method for removing algin and algin containing coatings generally comprises adding a water soluble calcium sequestering agent to water at room temperature, immersing the coated food product therein, removing the coated food product therefrom after a short period of immersion, exposing the algin or algin containing coating to air at room temperature to thaw until same becomes spongy and viscous, and rinsing the food product with water to remove the coating.

There are a great number of sequestering agents suitable for purposes of my invention. Among the broad general types are aromatic and aliphatic amines, hydroxy acids, dicarboxylic acids, amino acids, condensed inorganic phosphates and certain phenolic compounds. The sequestering agent, which may include mixtures should be one which itself will not impart any undesirable odor, flavor, and, preferably, color to the starch, and since the ultimate use of the products of my invention is for food purposes, the sequestering agent should be non-toxic. Condensed inorganic phosphates are peculiarly effective and the preferred sequestering agents for purposes of my invention. Condensed inorganic phosphates comprise that group of compounds usually prepared by heating primary or secondary orthophosphates to effect elimination of water and/or polymerization of the phosphate. The products include the following: metaphosphates, as sodium metaphosphate $(NaPO_3)_x$; pyrophosphates, as tetrasodium pyrophosphate, $Na_4P_2O_7$ and sodium acid pyrophosphate, $Na_2H_2P_2O_7$; and the various alkali metal polyphosphates such as sodium tripolyphosphate, $Na_5P_3O_{10}$, alkylenediaminepolyacetic acid salts such as the sodium salt ethylenediaminetetraacetic acid, the potassium salt of propylenediaminetetraacetic acid, sodium salt of ethylenediamine-di-(-orthohydroxyphenyl)-diacetic acid, sodium salt of ethylenediamine-di-(hydroxyethyl)-diacetic acid, etc.

For example, in the case of breaded seafood, such as breaded shrimp or breaded oysters which have been coated, breaded and frozen, sodium tripolyphosphate (also referred to as Na TPP hereinbelow) is the preferred calcium sequestering agent.

A concentration of ten grams of sodium tripolyphosphate per gallon of de-breading solution is effective in removing the coating from the breaded shrimp or oysters. The sodium tripolyphosphate is added directly to pure drinking water, after which the coated food product is immersed therein. The de-breading procedure is carried out in the manner normally employed in this industry. Repeated tests on coating removal in connection with de-breading indicates a final, de-coated and de-breaded product to be within 2% of the original known weight of the food before coating and breading.

The following examples of algin and algin containing coating removals are merely illustrative and are not to be construed as limiting the scope of invention.

EXAMPLE I

Trout fillet and kingfish steaks were coated with a solution of 10.0 grams Kelco Gel HV algin mixed with 50.0 grams of Pillsbury's Best Instant Blending Enriched Flour in 940.0 grams of pure drinking water. These coatings were then removed by dipping the coated trout fillets and kingfish steaks into a solution containing 12.5 grams of sodium tripolyphosphate and 87.5 grams of pure drinking water, for approximately two minutes, removing the coated food product therefrom, exposing the dipped coated food product to air at room temperature for approximately two minutes and thereafter rinsing with water to remove the coating. The following results were observed:

|  | Trout fillets | Kingfish steak |
|---|---|---|
| Original weight before coating | 111.0 | 110.1 |
| Weight after coating | 129.3 | 123.9 |
| Weight after removal of coating and drying of excess surface moisture | 110.3 | 113.6 |
| Percent gain or loss from original weight | [1] 0.6 | [2] 3.7 |

[1] Loss. [2] Gain.

EXAMPLE II

Trout fillets and kingfish steaks were coated with a solution containing 10 grams Kelco Gel HV algin in 990.0 grams of pure drinking water. These coatings were then removed by dipping the coated trout fillets and kingfish steaks into a solution of 12.5 grams of sodium tripolyphosphate and 87.5 grams of pure drinking water and the procedure as outlined in Example I followed, except that the coated food product was allowed to remain in the sodium tripolyphosphate solution for one minute and was allowed to stand in the air at room temperature for one minute prior to rinsing with water. The following results were observed:

|  | Trout fillets | Kingfish steak |
|---|---|---|
| Original weight before coating, g | 109.0 | 127.6 |
| Weight after coating, g | 118.3 | 134.3 |
| Weight after removal of coating and drying of excess surface moisture, g | 111.4 | 129.1 |
| Percent gain or loss from original weight | [1] 2.2 | [1] 1.2 |

[1] Gain.

EXAMPLE III

Trout fillets were coated with a mixture of algin and dextrose and then frozen. The algin dextrose coating was removed from the frozen trout fillets by dipping in a 12.5% solution of sodium tripolyphosphate, removing the trout fillets therefrom and exposing same to air at room temperature and thereafter rinsing off the coating with water. The following results were observed:

| Weights | Trout fillets No. 1 | Trout fillets No. 2 |
|---|---|---|
| Weight before coating, g | 117.3 | 110.2 |
| Weight after coating, g | 132.4 | 118.0 |
| Per cent Coating added, percent | 13.3 | 7.1 |
| Weight after dipping in NaTPP, surface thawing and rinsing, g | 119.8 | 111.7 |
| Percent gain or loss from original weight | [1] 2.1 | [1] 1.3 |

[1] Gain.

EXAMPLE IV

The following results were observed using shelled and deveined fresh shrimp which were coated with a 90% malto dextrin, 10% sodium alginate solution gelled with a 0.5 molar calcium chloride solution containing a small quantity of carboxymethyl cellulose gum, with and without batter and breading, using as the coating removal solution 15 grams of sodium tripolyphosphate dissolved in six quarts of the debreading solution. The term "malto dextrin" is the name given to a corn syrup having a low dextrose equivalent by the Food and Drug Administration. The coated food product was permitted to remain in the sodium tripolyphosphate solution for ten minutes and the liquid then strained therefrom. All of the coating and breading was removed and the uncoated food product was permitted to drain for ten minutes and then weighed.

| No. | Original weight (g.) | Weight after dusting with potato starch and applying FlavorTex coating (g.) | Weight after batter and breading (g.) | Weight after debreading (g.) | Percentage of original weight of shrimp, percent |
|---|---|---|---|---|---|
| 1 | 71.2 | 83.0 |  | 71.2 | 100.0 |
| 2 | 76.1 | 85.7 |  | 75.9 | 99.7 |
| 3 | 31.2 | 40.1 | 53.9 | 32.0 | 102.5 |
| 4 | 30.3 | 39.4 | 76.9 | 29.5 | 97.5 |
| 5 | 90.0 | 126.5 | 191.7 | 90.2 | 100.2 |
| 6 | 98.7 | 128.4 | 178.5 | 99.1 | 100.5 |
| 7 | 192.8 | 260.1 | 406.8 | 191.8 | 99.5 |
| 8 | 193.0 |  | 408.4 | 191.7 | 99.2 |

In all of the above examples the weight of the coated food product after removal was substantially the same as the original weight. Furthermore, the color, texture and general appearance of the product after removal of the coating was substantially the same as that of the product prior to coating.

The length of time the coated food product is to remain in the sodium tripolyphosphate solution is not critical. The higher the concentration of the sodium tripolyphophate in the coating removal solution, the shorter period of time will generally be required. Also, the thawing time can vary, depending on the concentration of the sodium tripolyphosphate solution and the length of time the food product remains therein; in fact, the entire coating can be removed while the food product remains in the coating removal solution, as shown by Example IV. The time the coated food product remains in the coating removal solution, its concentration and the thawing time will all be readily apparent to those skilled in the art.

I claim:

1. A method of removing a food coating comprising algin containing compositions from a coated food product comprising the steps of
   (a) treating the coated food product with an aqueous solution of a sequestering agent for calcium at room temperature to prevent change in the nature and character of the food product and to cause said coating to dissolve, and
   (b) washing said dissolved coating from the food product.

2. The method as defined in claim 1 wherein said sequestering agent comprises an alkali metal polyphosphate.

3. The method as defined in claim 1 wherein said sequestering agent is sodium tripolyphosphate.

References Cited

UNITED STATES PATENTS

| 2,611,708 | 9/1952 | Owens et al. | 99—169 X |
| 2,770,551 | 11/1956 | Hall et al. | 99—159 X |
| 2,965,494 | 12/1960 | Williams | 99—169 X |
| 3,154,423 | 10/1964 | Voegeli et al. | 99—107 X |

HYMAN LORD, Primary Examiner

U.S. Cl. X.R.

99—168, 169